C. ROBINSON.
Toy-Bird.
No. 196,704. Patented Oct. 30, 1877.
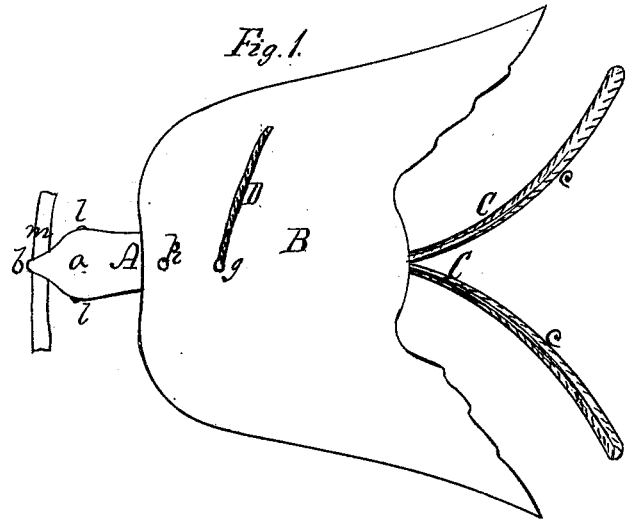
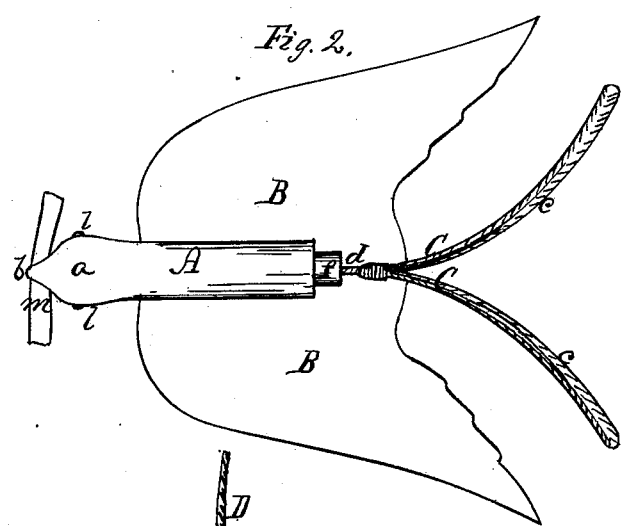
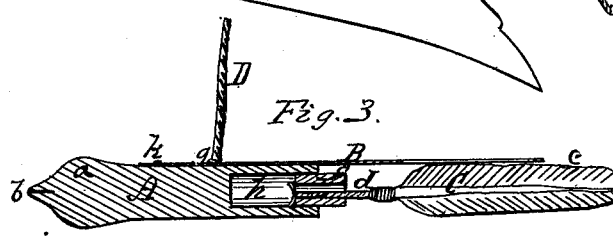
WITNESSES,
Jno. D. Patten.
P. W. Perry
INVENTOR,
Charles Robinson,
By J. S. Brown,
his ATTORNEY.

UNITED STATES PATENT OFFICE.

CHARLES ROBINSON, OF CAMBRIDGEPORT, MASSACHUSETTS.

IMPROVEMENT IN TOY BIRDS.

Specification forming part of Letters Patent No. 196,704, dated October 30, 1877; application filed August 31, 1877.

*To all whom it may concern:*

Be it known that I, CHARLES ROBINSON, of Cambridgeport, in the county of Middlesex and State of Massachusetts, have invented an Improved Toy Bird; and I do hereby declare that the following is a full and exact description thereof, reference being had to the accompanying drawings, making part of this specification.

Figure 1 represents a top view of the toy bird; Fig. 2, a view of the under side thereof; Fig. 3, a longitudinal vertical section of the same; Fig. 4, a partial section, showing a modification of its construction.

Like letters designate corresponding parts in all of the figures.

The main features of the construction of the bird are a body, A, generally turned from a piece of wood, with a form of head, $a$, and beak $b$ to sufficiently resemble a real bird, a wing and back piece, B, formed of paper or other suitable material which is light and will remain in shape, being attached to the body and covering the same, except the head and beak thereof; and a tail, C, composed of feathers $c\ c$, curved or spread apart from each other, substantially as shown, and attached to a wire, $d$, which projects forward, and is held loosely, so as to revolve with entire freedom in a tube, $f$, as a bearing at the rear end of the body. The whole is suspended by a string or cord, D, attached to the bird by a tack, $g$, at a point where it will be held balanced in a horizontal or nearly horizontal position; the cord being employed to swing and flourish the bird in the air, by which motion the tail C is caused to revolve quickly, and thereby give an exceedingly life-like and natural appearance to the bird. The cord may be attached at its other end to a rod, to be held in the hand, whereby a much more enlarged and pleasing flight may be given to the bird.

The mounting of the tail C so as to have the free revolving movement is effected substantially in the following manner: The feathers $c\ c$ are attached to the wire $d$, or its equivalent, which is passed into the tube or bearing $f$, having a longitudinal hole therein large enough for the wire to turn therein with the utmost freedom. The wire, once inserted through the tube, is retained loosely therein by bending or turning its forward ends (or generally two ends of a doubled wire twisted together) outward, as shown, so that it cannot be drawn out by the motion of the bird. To secure the tube $f$ in place, a hole, $h$, is made in the rear end of the body A, into which hole the tube (generally made of wood and slightly conical in form) is driven a part of its length, or until it is securely wedged in place.

Instead of the wooden tube, a short glass tube, as shown in Fig. 4, may be employed; and to secure it in place and protect it from too much jar and liability to break, it is held in the body A by means of a short packing-tube, $i$, of india-rubber, cork, or equivalent soft material.

The wing and back piece B is generally made of paper of sufficient firmness to remain in position and retain its outspread form; but an equivalent stiff and light material may be used instead of the paper or pasteboard. It is cut into a proper shape to represent the back and outspread wings of a bird; and to give it a more natural and pleasing appearance, it is printed or stamped in colors or shade to represent the appearance of different kinds of birds. Thus a very pleasing variety is given to different specimens of the article. It is attached to the body by simple tacks $g\ k$, or otherwise. The suspending-cord D may be attached by one of the tacks $g$, which secures the wing-piece to the body. The suspension is at such a point that the bird will hang in a nearly horizontal position, the two ends of the body balancing each other.

The eyes of the bird may be represented by the heads of bright tacks or nails, $l\ l$, driven into the sides of the head. A bit of ribbon or braid, $m$, may be inserted in the mouth, as shown.

This construction (the necessary changes being made) is also applicable to toy fishes, the tail being constructed to turn in a similar manner; but instead of forming the tail of feathers, as with the birds, they may be made of any material (as papier-machè) to imitate the fin-tails of fishes.

What I claim as my invention, and desire to secure by Letters Patent, is—

1. A toy bird composed of a wooden body, A, formed with a head and beak, a back and wing piece, B, of paper or equivalent light material, and a revolving tail, C, made of feathers, substantially as and for the purpose herein specified.

2. The combination of the bored body A, revolving tail C, and coupling-tube or bearing f, substantially as and for the purpose herein specified.

3. The beak b, provided with a piece of ribbon or braid, m, as herein specified.

The foregoing specification signed by me this 27th day of August, 1877.

CHARLES ROBINSON.

Witnesses:
 J. S. BROWN,
 JOHN ROWE.